US012723745B2

(12) United States Patent
Samson

(10) Patent No.: US 12,723,745 B2
(45) Date of Patent: Sep. 1, 2026

(54) TILT MECHANISM FOR A LIGHT FIXTURE

(71) Applicant: Mark Samson, Las Vegas, NV (US)

(72) Inventor: Mark Samson, Las Vegas, NV (US)

(73) Assignee: IP LLC a Series of Moda Light LLC, Las Vegas, NV (US)

( * ) Notice: Subject to any disclaimer, the term of this patent is extended or adjusted under 35 U.S.C. 154(b) by 0 days.

(21) Appl. No.: 19/358,887

(22) Filed: Oct. 15, 2025

(65) Prior Publication Data

US 2026/0110425 A1 Apr. 23, 2026

Related U.S. Application Data

(60) Provisional application No. 63/708,406, filed on Oct. 17, 2024.

(51) Int. Cl.
*F21V 21/30* (2006.01)

(52) U.S. Cl.
CPC .................................... *F21V 21/30* (2013.01)

(58) Field of Classification Search
CPC ..... F21V 21/30; F21S 4/20; F21S 4/22; F21S 4/24; F21S 4/26; F21S 4/28
See application file for complete search history.

(56) References Cited

U.S. PATENT DOCUMENTS 8,075,163 B2 * 12/2011 Xiao ..................... F21V 29/763 362/249.02
10,323,834 B2 * 6/2019 Corbo ....................... F21S 4/28
2010/0328945 A1 * 12/2010 Song ....................... F21V 21/30 362/240
2011/0286208 A1 * 11/2011 Chen ....................... F21V 21/30 362/217.1
2015/0192261 A1 * 7/2015 May ....................... H05B 45/10 362/218

FOREIGN PATENT DOCUMENTS

EP 2711624 A1 * 3/2014 ............. F21V 21/26

* cited by examiner

*Primary Examiner* — Robert J May
(74) *Attorney, Agent, or Firm* — Snell & Wilmer LLP

(57) ABSTRACT

A light fixture is provided. The light fixture includes a fixture housing, a number of light emitting elements supported by the fixture housing and each configured to emit visible light, and at least one tilt mechanism for adjusting an angular position of the light fixture. The tilt mechanism comprises a mount which is pivotally connected to the housing. The mount has a foot and an extension which is rotatably received in a receiver which is located in the housing. The mount and the receiver may be connected by a connector and a coupling member is positioned between the extension and the receiver to resist rotation of the mount relative to the housing.

19 Claims, 8 Drawing Sheets

TILT MECHANISM FOR A LIGHT FIXTURE

RELATED APPLICATION DATA

This application claims priority to U.S. Provisional Application Ser. No. 63/708,406, filed Oct. 17, 2024, which application is incorporated by reference herein in its entirety.

FIELD OF THE INVENTION

The present invention relates to light fixtures, and in particular to light fixtures which are position adjustable.

BACKGROUND OF THE INVENTION

A variety of light fixtures, such as which are configured to illuminate one or more incandescent, fluorescent or LED bulbs, or arrays of light emitting diodes, are known in the art. In some cases, these lights are configured for fixed mounting, such as in a fixed position in a ceiling, or via a lamp stand or the like.

However, other light fixtures may be configured for adjustable mounting, such as to change the position of the light relative to a support structure. For example, outdoor flood lamps often have sockets which are rotatably adjustable relative to a base which is affixed to a building. The rotatability of the socket allows the user to adjust the direction that the bulb in the socket directs light.

For example, some light fixtures may comprise a body which is mounted to a support via one or more external brackets or knuckles, thus allowing the angle of the fixture to be adjusted, such as tilted, relative to the support. These types of mounts, however, often undesirably require the fixtures to be fixed at relatively high heights with respect to the ground, which results in a greater likelihood that dark spots will appear at a bottom of a wall surface. Moreover, known methods of adjusting tilt angles with respect to structures often present with "clicks" or other restrictions to the movement, which undesirably prevents a precise angle of tilt from being enabled.

It is with respect to these and other considerations that the instant disclosure is concerned.

SUMMARY OF THE INVENTION

Aspects of the invention comprise a tilt mechanism for a light fixture, a light fixture with a tilt mechanism, and a method of adjusting a tilt position of a light fixture. In one embodiment, a light fixture comprises a support structure such as a fixture housing, a number of light emitting elements supported by the fixture housing and each configured to emit visible light, and at least one tilt mechanism for adjusting an angular position of the light fixture.

In one embodiment, the tilt mechanism comprises a receiver and an extension which is configured to be rotatably received by the receiver. In one embodiment, the receiver is associated with the light fixture housing, such as an end or end plate thereof, and extends inwardly into an interior of the housing. The extension may be associated with the mount, which also defines a mounting foot.

In one embodiment, the extension and the receiver may be rotatably connected, such as with a threaded fastener. Further, a means may be provided for resisting rotation of the extension relative to the receiver. In one embodiment, this means may comprise a coupler, such as a washer having ribbed front and rear faces. The washer may be located between an end of the extension and the receiver.

In one embodiment, in accordance with a method of the invention, a user may loosen the threaded fastener and rotate the mount from a first position to a second position. The user may then tighten the fastener to secure the mount to the light fixture in a desired rotational position, such as via the aid of the coupler.

In one embodiment, the light fixture may have first and second ends and a tilt mechanism may be located at both ends. In such an embodiment, the light fixture may have a first axis which extends through the ends, and the tilt mechanisms may be configured to rotate about axes which are parallel to the first axis.

In one embodiment, rotational position indicators may be associated with the housing and/or mount, such as to indicate a rotational position of the mount relative to the housing.

Further objects, features, and advantages of the present invention over the prior art will become apparent from the detailed description of the drawings which follows, when considered with the attached figures.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise a tilt or angular positioning mechanism for a light fixture, a light fixture having a tilt mechanism, and methods of controlling or adjusting the tilt or angular position of a light fixture.

Figure 1:
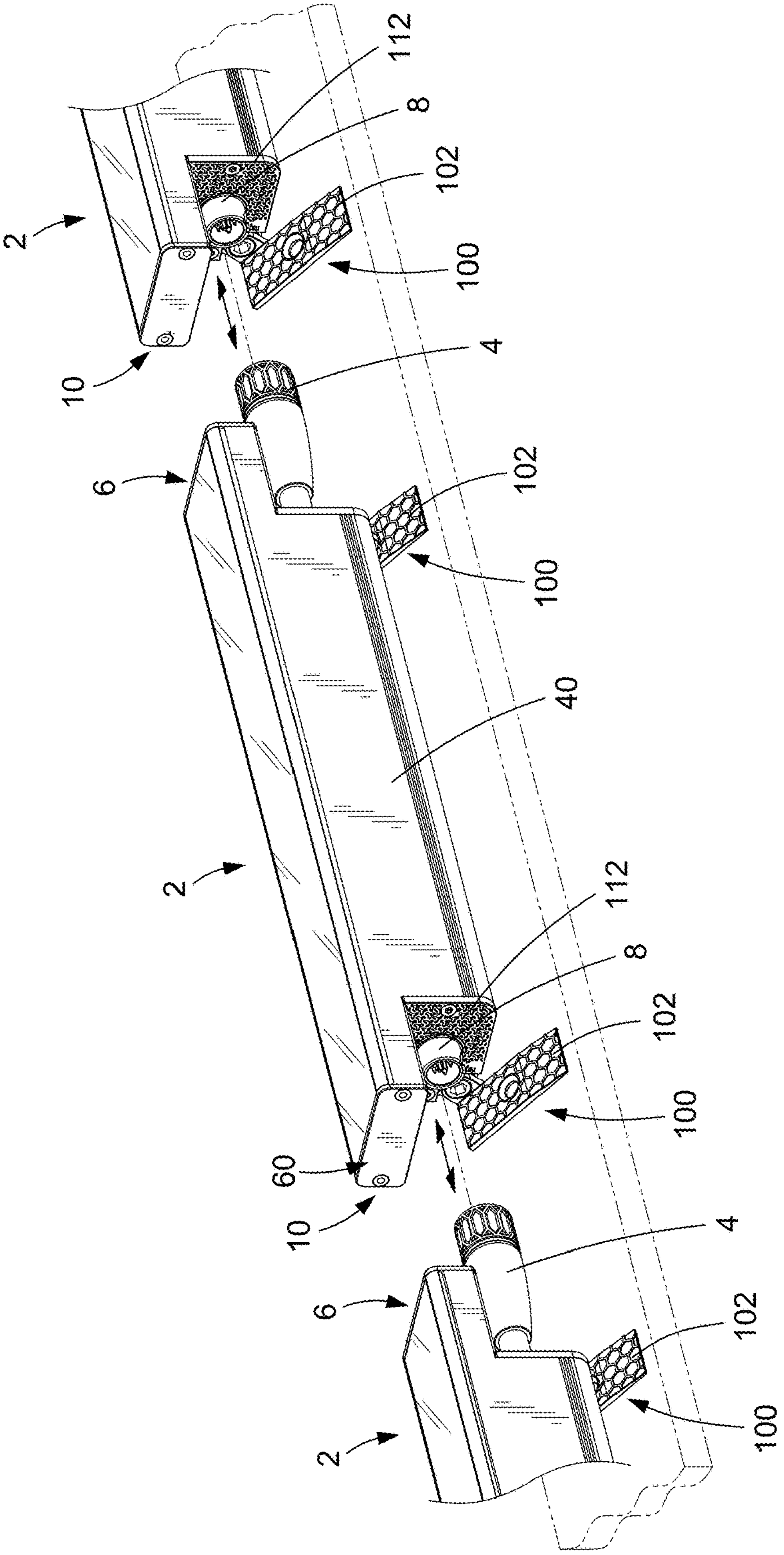
FIG. 1 illustrates a light fixture having a tilt mechanism in accordance with an embodiment of the present invention, the light fixture configured to be connected to one or more other light fixtures.

The tilt mechanism of the invention may be utilized in association with light fixtures having a number of different configurations. One preferred configuration of a light fixture 2 with which the tilt mechanism may be used is illustrated in FIG. 1. As illustrated therein, in one embodiment, these light fixtures 2 may be configured to be connected to one another in series.

Figure 2:
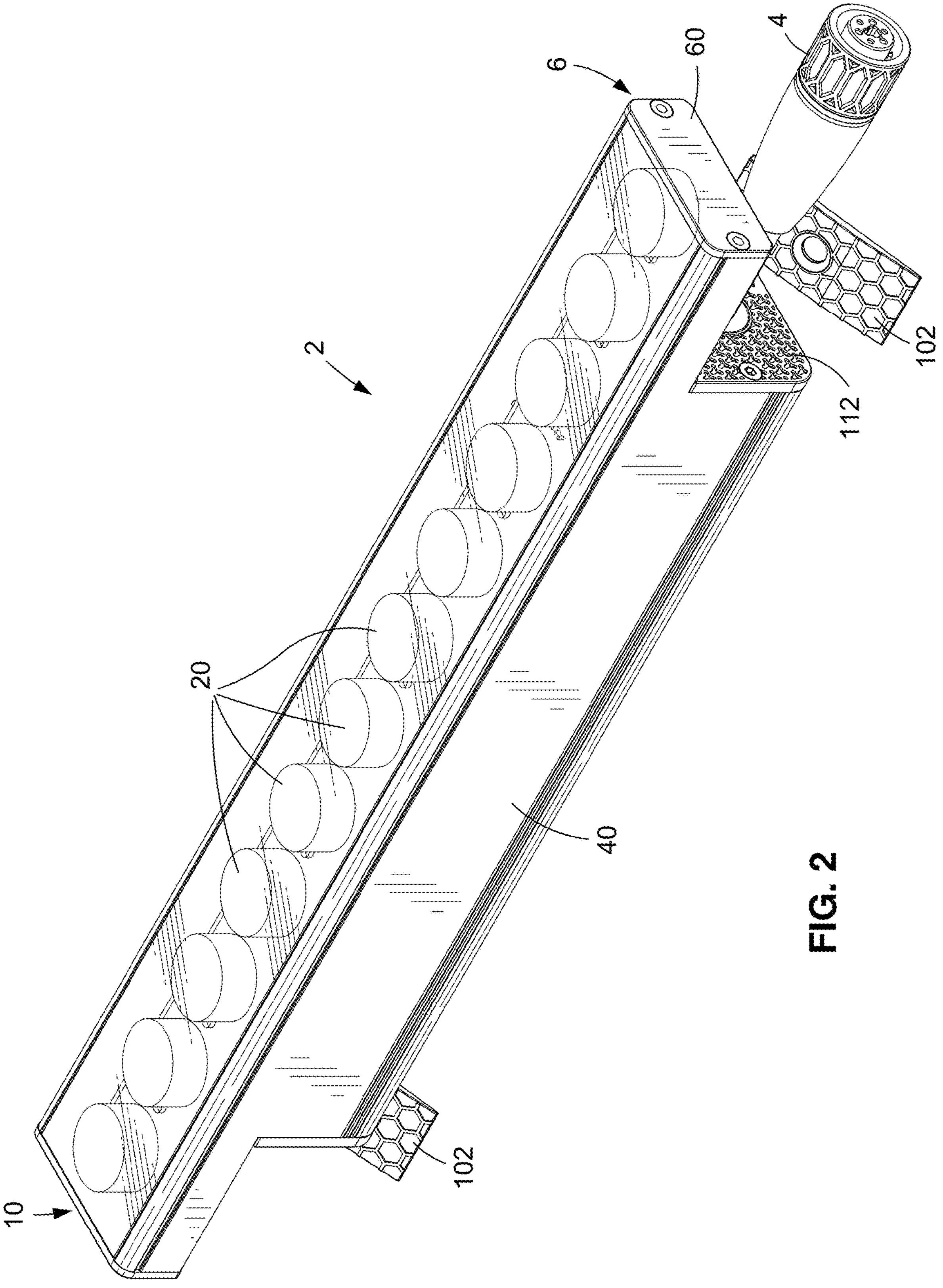
FIG. 2 is a top perspective view of the light fixture illustrated in FIG. 1.
Figure 3:
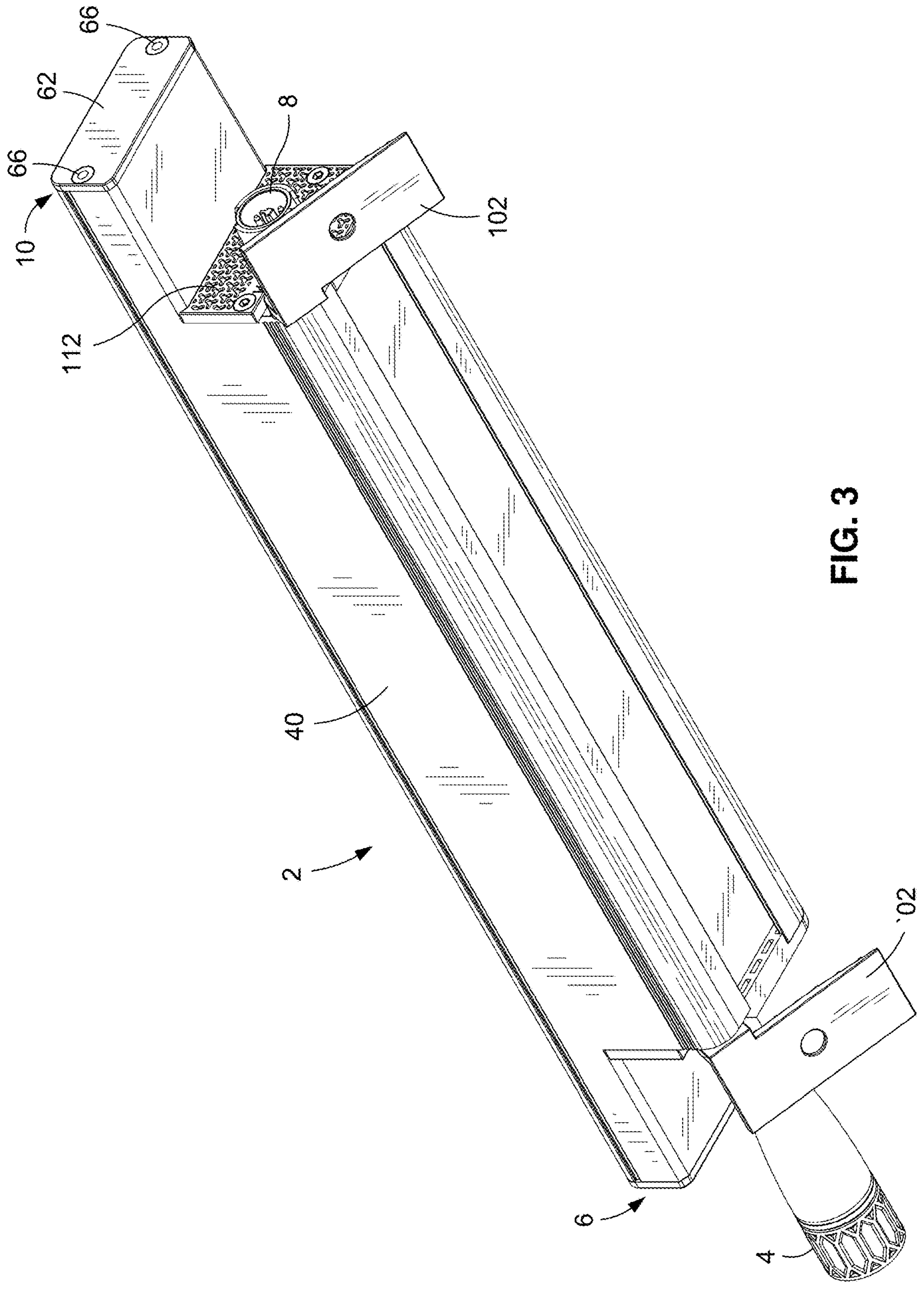
FIG. 3 is a bottom perspective view of the light fixture illustrated in FIG. 2.
Figure 4:
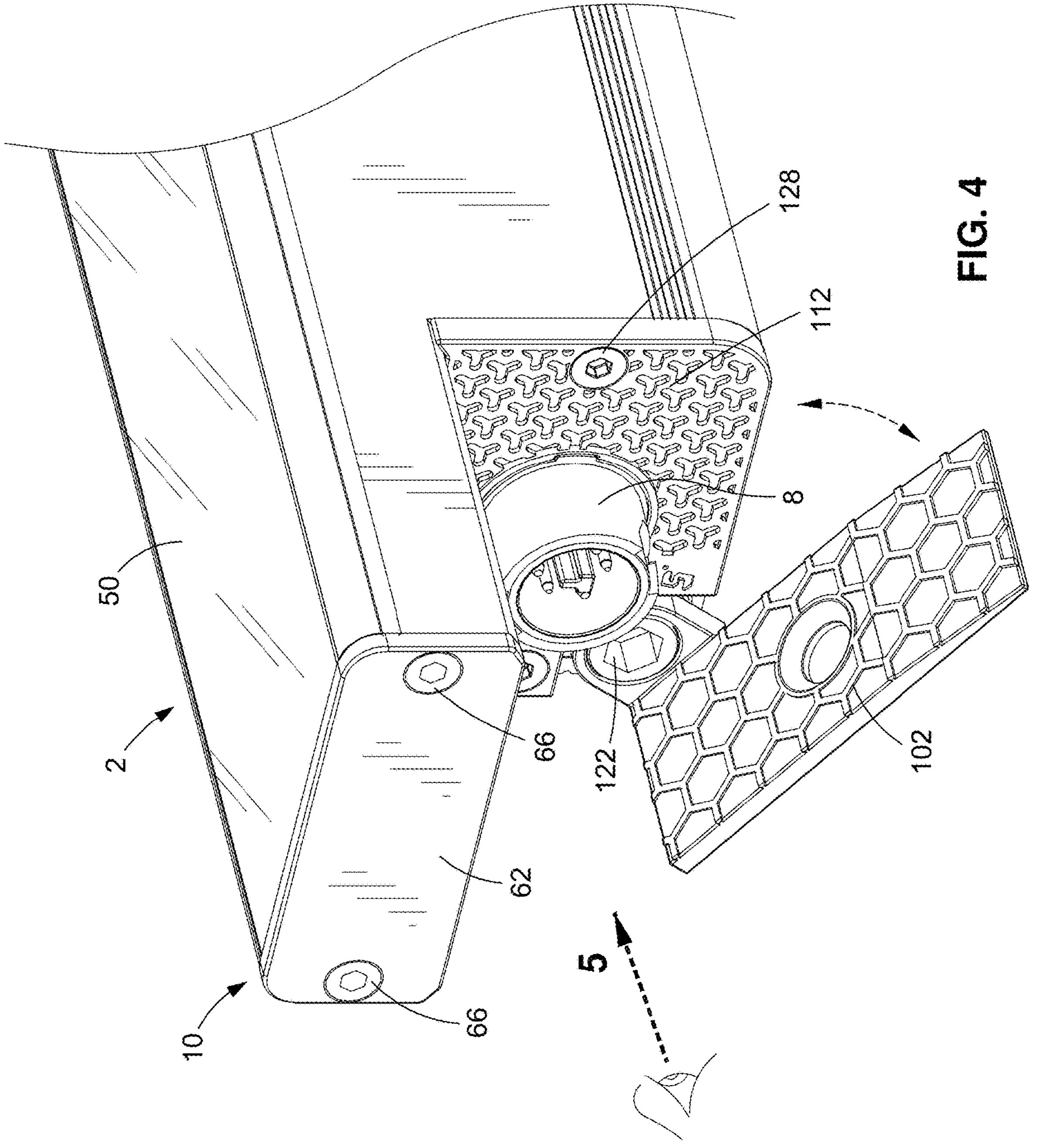
FIG. 4 is an enlarged perspective view of an end of the light fixture illustrated in FIG. 1, showing a tilt mechanism thereof.
Figure 10:
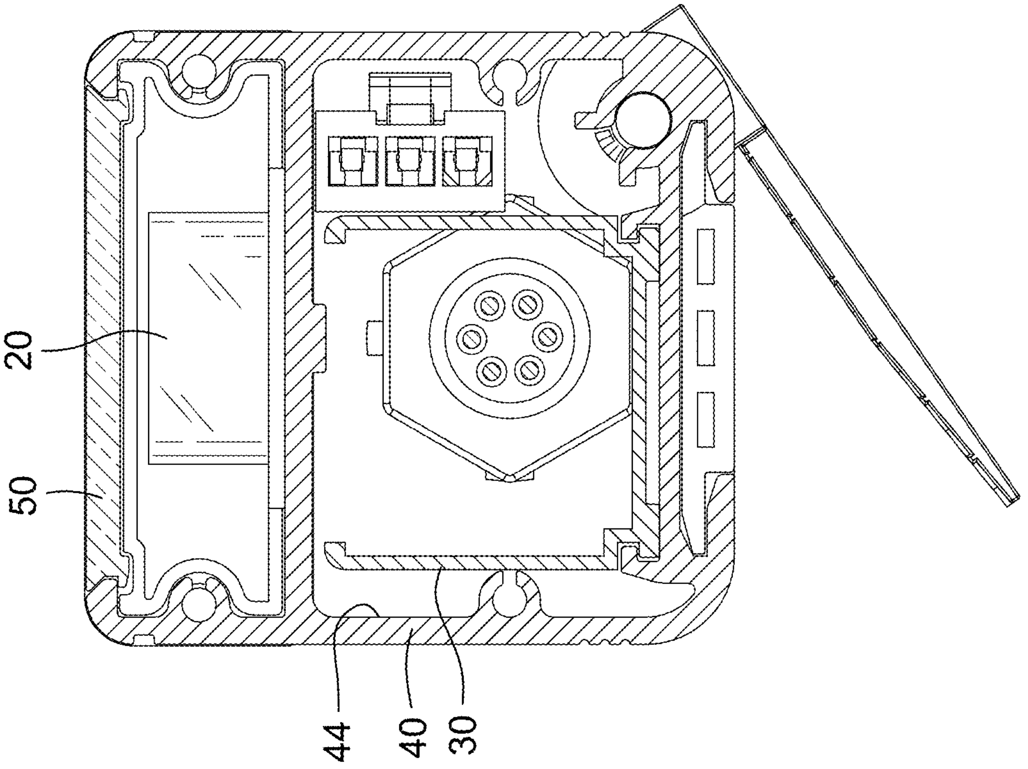
FIG. 10 is a cross-sectional view of the light fixture illustrated in FIG. 1.
Figure 9:
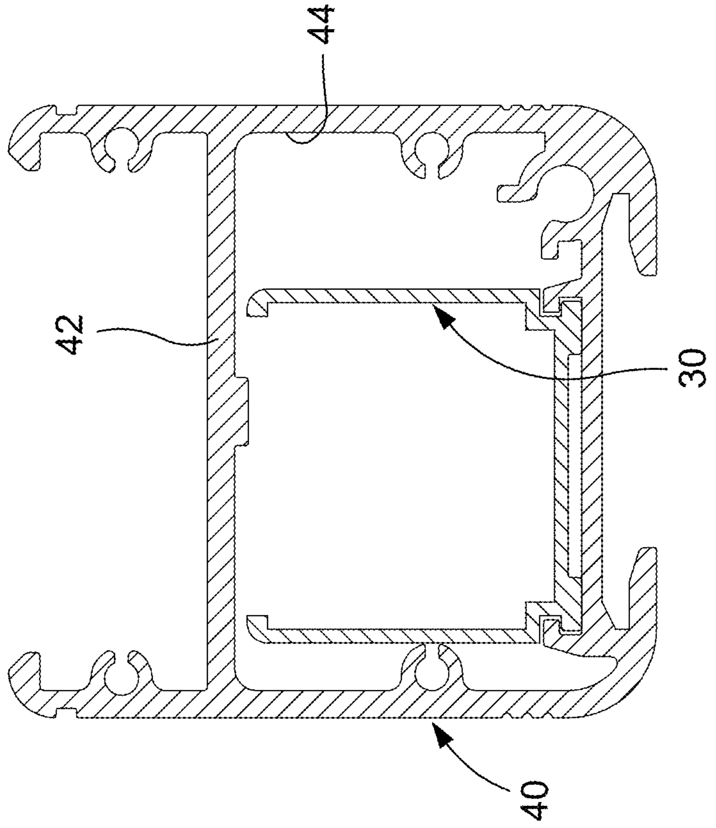
FIG. 9 is a cross-sectional view of a housing portion of the light fixture illustrated in FIG. 6 taken along line 9-9.

FIGS. 2-4 illustrate various views of one of the light fixtures 2 illustrated in FIG. 1. In the illustrated embodiment, the light fixture 2 has a generally elongate body including a first or internal support structure 30 (FIG. 6) generally located internally with respect to, and coupled to, a second support structure 40. The second support structure 40 may comprise a fixture housing. The fixture housing 40 and associated internal support structure 30 support and house lighting components, as shown in FIGS. 9 and 10. In this regard, the first support structure 30 may comprise a bracket or other mounting structure, such as which may be configured to contain or support one or more elements of the light fixture 2.

The light fixture 2 has a first end 6 and an opposing second end 10. In one embodiment, the light fixtures 2 may have a male connector 4 at the first end 6, and a female connector 8 at the second end 10. These connectors 4 and 8 advantageously allow the various light fixtures 2 to be connected to a power source or power and control source, such as a powered controller, such as via a flexible connector. The male and female connectors 4 and 6 also allow the light fixtures 2 to be connected in series (e.g. with a female connector 8 of one light fixture plugged into a male connector 6 of another fixture).

As indicated, the connectors 4 and 8 preferably facilitate the transmission of electrical power and may provide the transmission of control signals (e.g., LED on and off, as well as dimming or color signals), such as via connection to a circuit board with which LEDs are associated. In one embodiment the male and female connectors may define a plurality of individual leads (such as in the form of pins) and ports for receiving the pins, such as to provide an electrical path for power, individual control signals and the like, as is well known in the art.

While the light fixture 2 might include various light emitting elements, in one embodiment and as shown in FIG. 2, the light fixture 2 preferably includes a plurality of light emitting diodes (LEDs) 20. The LEDs 20 are preferably controlled (have power selectively provide thereto, etc.) via a controller, such as which is implements as a circuit board which is in communication with the male and/or female connectors 4 and 6 for receiving power and control signals therefrom. The controller may be supported, for example, by the internal support structure 30.

In one embodiment, the LEDs 20 may be located within a top portion 42 of the fixture housing 40 and be configured to direct light outwardly of the top of the fixture 2. In such a configuration, a cover panel 50 may be connected to the fixture housing 40 and be located over the LEDs 20. It will be appreciated that the cover panel 50 may be partially or fully transparent and may enclose the LEDs 20 within the top portion 42 of the fixture housing 40, such that the LEDs emit visible light through the cover panel 50.

As illustrated, end panels 60 and 62 may be connected to the top portion 42 of the fixture housing 40 at the ends 6 and 8 thereof, such as to enclose the ends of the top portion 42 thereof. The end panels 60,62 may be connected to the fixture housing 40 via connectors or coupling members 64 and 66, such as screws.

In accordance with the disclosed concept, the light fixtures 2 each include at least one, and preferably a pair of tilt mechanisms 100. In one embodiment, a tilt mechanism 100 is provided at each end 6 and 10 of the fixture body 40. In one configuration, each tilt mechanism 100 is the same. Each tilt mechanism 100 preferably includes a mount 102. As described in more detail below, the mount 102 is useful in mounting or connecting the light fixture to a support structure (such as a wall or ceiling of a structure or the like). The mount 102 may have various configurations, such as a generally planar foot or having other shapes (such as depending on the structure to which the light fixture 2 is to be mounted). The foot portion may have a planar bottom surface for engagement with a support surface and might be connected to the support surface with one or more fasteners or other connectors.

The tilt mechanisms 100 are preferably configured to allow the angular position of the light fixture 2 to be changed relative to the mounts 102. Because the mounts 102 are configured to a support, the tilt mechanism 100 thus allows the angular position of the light fixture 2 to be changed relative to the support structure.

Figure 6:
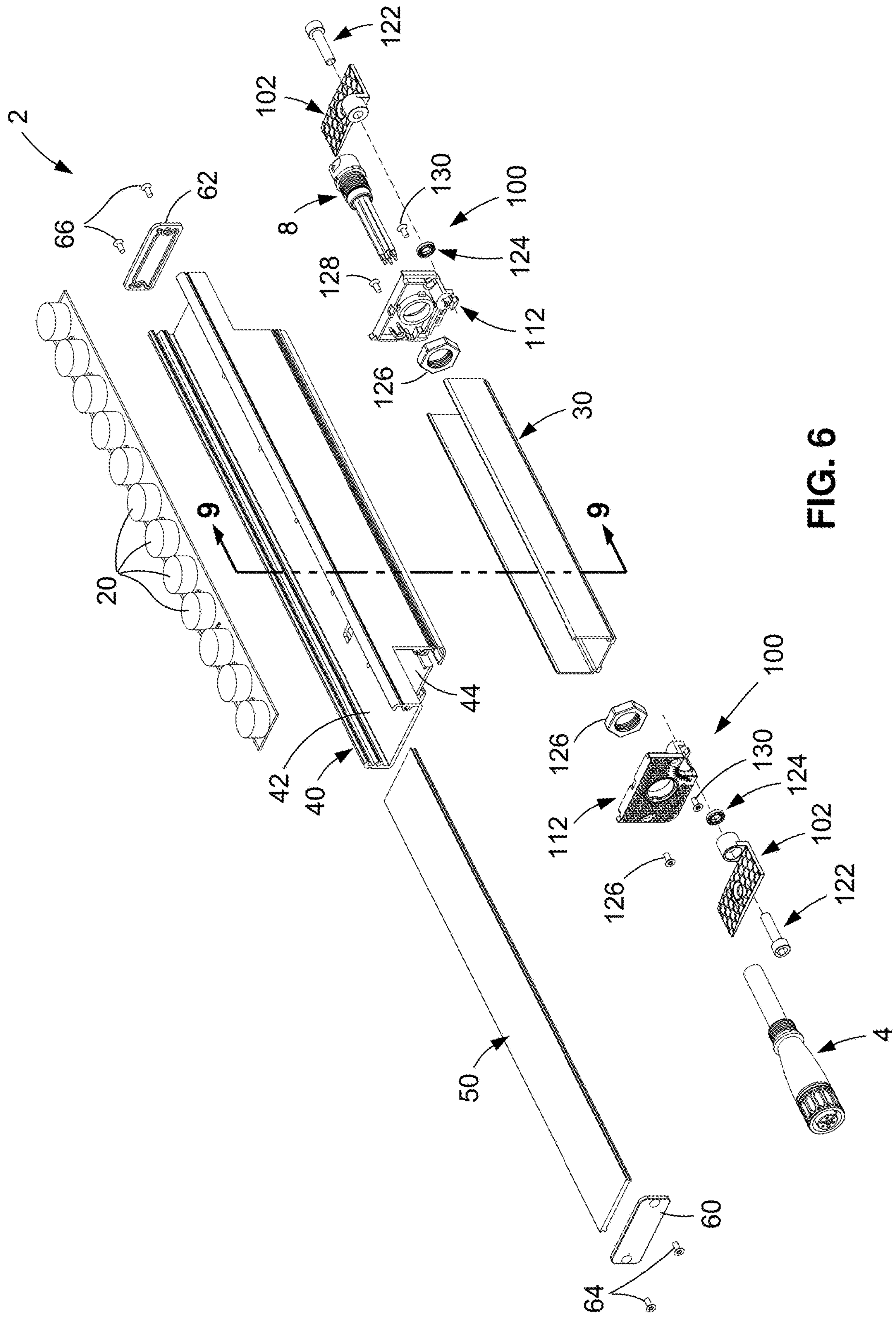
FIG. 6 is an exploded view of the light fixture illustrated in FIG. 6.

In one example, as shown in FIG. 6, aside from the mount 102, the tilt mechanisms 100 each include a corresponding support plate 112 and a corresponding number of coupling members. In general, the support plate 112 may be configured as an end cap for the lower portion 44 of the fixture housing 40.

As shown, the male and female connectors 4 and 8 are each configured to extend through an aperture in a corresponding one of the support plates 112. The male and female connectors 4 and 8 may be secured to a respective support plate 112, such as via a coupling member 126, which may comprise a ring nut.

As indicated above, and continuing to refer to FIG. 6, the support plates 112 are each configured to be coupled to a lower portion 44 of the fixture housing 40 via one or more coupling members 128 and 130, such as screws or bolts which extend through the support plates 112 and into receiving portions (optionally threaded receiving portions) of the fixture housing 40. In this manner, the support plates 112 provide fixed anchor points about which the mounting plates 102 and 202 can rotate to allow for desired tilting of the light fixture 2, given that the support plates 112 are preferably fixedly coupled to the lower portion 44.

Figure 8:
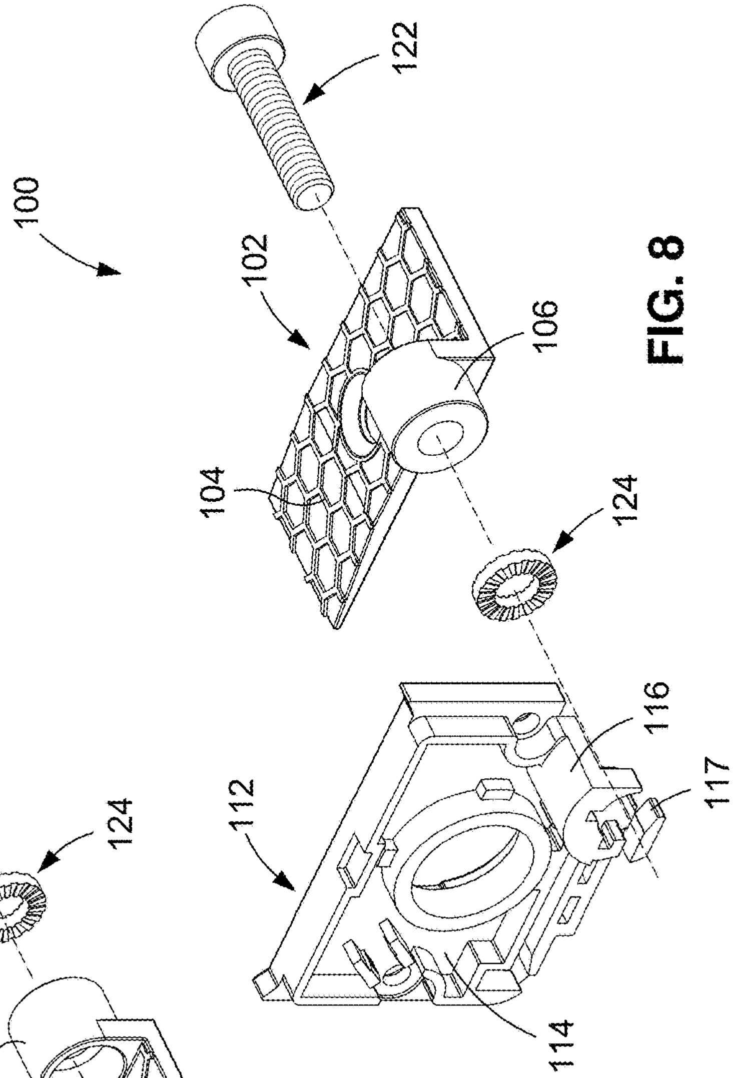
FIGS. 7 and 8 are exploded views of the tilt mechanism of the light fixture which is illustrated in FIG. 1.
Figure 7:
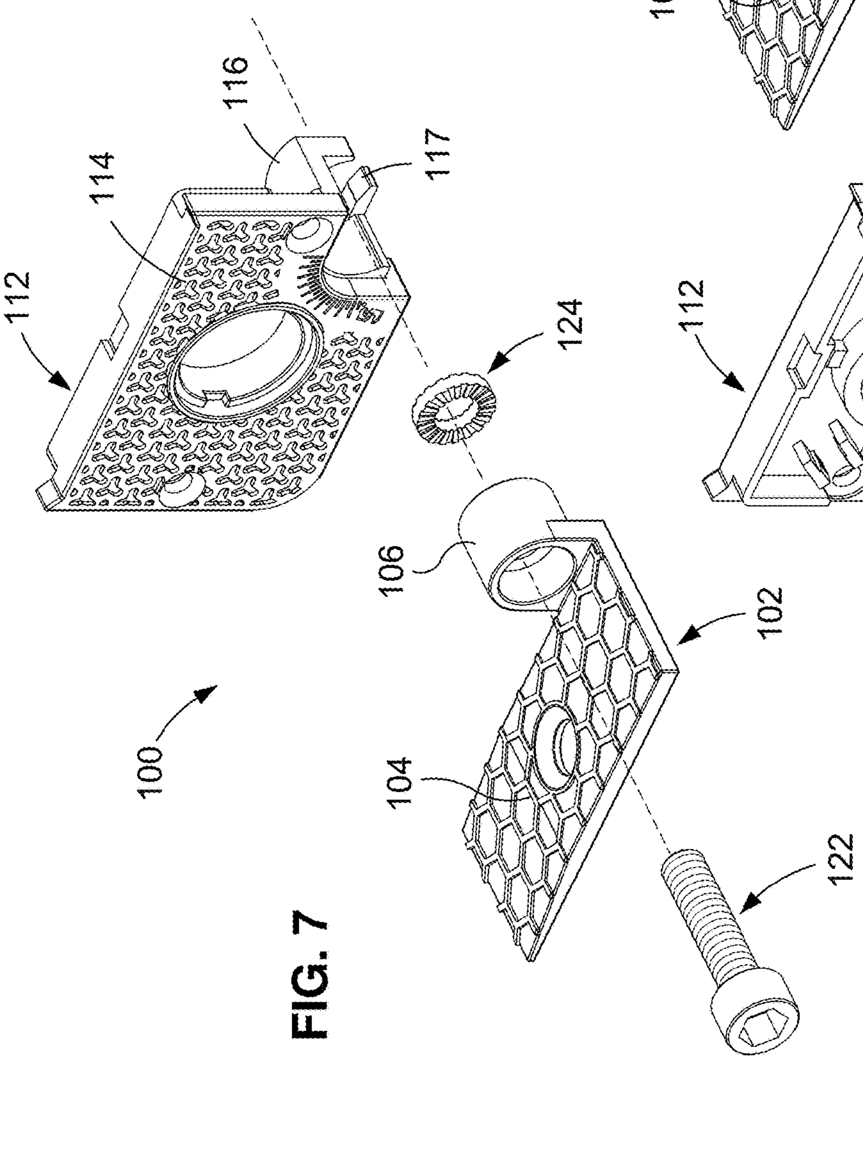

FIGS. 7 and 8 show exploded isometric views of portions of the tilt mechanisms 100. In general, the tilt mechanism 100 is configured to permit controlled adjustable rotational positioning of the mount 102 to its corresponding support plate 112. In one embodiment, the mounts 102 are thus rotatably connected to their corresponding support plate 112.

In one embodiment, the rotatable connection of the mount 102 to the support plate 112 (and thus the body of the light fixture 2) is via an extension which rotatably engages a receiver. For example, as shown, each of the mounts 102 includes a corresponding base portion, which optionally may be a planar member with a roughened surface, and a corresponding cylindrical or tubular-shaped extension 106 which extends outwardly from a side of the base portion (e.g. such that the extension 106 essentially acts as a male portion of a rotatable connection).

Furthermore, the support plates 112 each include corresponding base portions 114, corresponding receivers in the form of a generally cylindrical receiving portion 116 (e.g.

such that the receiving portion 116 acts as a female receiving portion to the extension 106 of the mount 102). In one embodiment, support plates 112 have a first or exterior side and a second or internal side, and the receiving portions 116 extend outwardly from second or interior side thereof (and into the lower portion 44 of the fixture housing 40 when the support plate 112 is mounted thereto).

In one example, extension 106 of the mount 102 is configured to be rotatably received in the receiving portion 116 of the support plate 112. In addition, means are provided for locking the relative positions of those members, such that the connection between the extension 106 and the receiving portions 116 allows for controlled and desirable tilting of the light fixture 2 (see FIG. 1-4).

Specifically, in one embodiment, a connector 122 is configured to join or connect the mount 102 to the support plate 112, such as by passing through a central passage through the extension 106 and into engagement with the support plate 112. In one embodiment, the connector 122 is threaded, and engages a thread-engaging portion of the support plate 112, such as which may include a biased tab 117 for tightly gripping the threads of the connector 122.

To aid in inhibiting undesired rotation of the mount 102 relative to the support plate 112, a coupler or coupling member, such as in the form of a locking washer 124, such as having radial ribs (or other gripping elements) on opposing sides may be provided between the extension 106 and the receiving portion 116. The locking washer 124 is configured to grip the end face of the extension 106 and an end face of the receiving portion 116 to resist relative rotation of these two components, when the tilt mechanism 100 is in a tightened position. In other embodiments, the ribbing might be formed on the end of the extension 106 and the receiving portion 116 to serve a similar function. In yet other embodiments, ribbing or similar elements might be located the radial exterior of the extension 106 for engagement by a tab or similar element which is associated with the receiving portion 116. In yet other embodiments, high friction material may be associated with the extension 106 and the receiving portion 116, such as a rubber washer which is adhered to the end of the extension 106 and to the inside end of the receiving portion 116, for a similar purpose.

Accordingly, when the tilt mechanisms 100 are in a loosened position, such as when the connectors 122 have been loosened by a user, the locking washers 124 do not resist such rotation, but rather allow the mounts 102 and associated support plates 112 to rotate and/or pivot with respect to one another.

In the configuration which is illustrated, the tilt mechanism 100 is configured to rotate about a first axis which extends parallel to a second axis which extends through the light fixture 2 from end to end (i.e., to rotate about the longitudinal direction of the light fixture).

Figure 5:
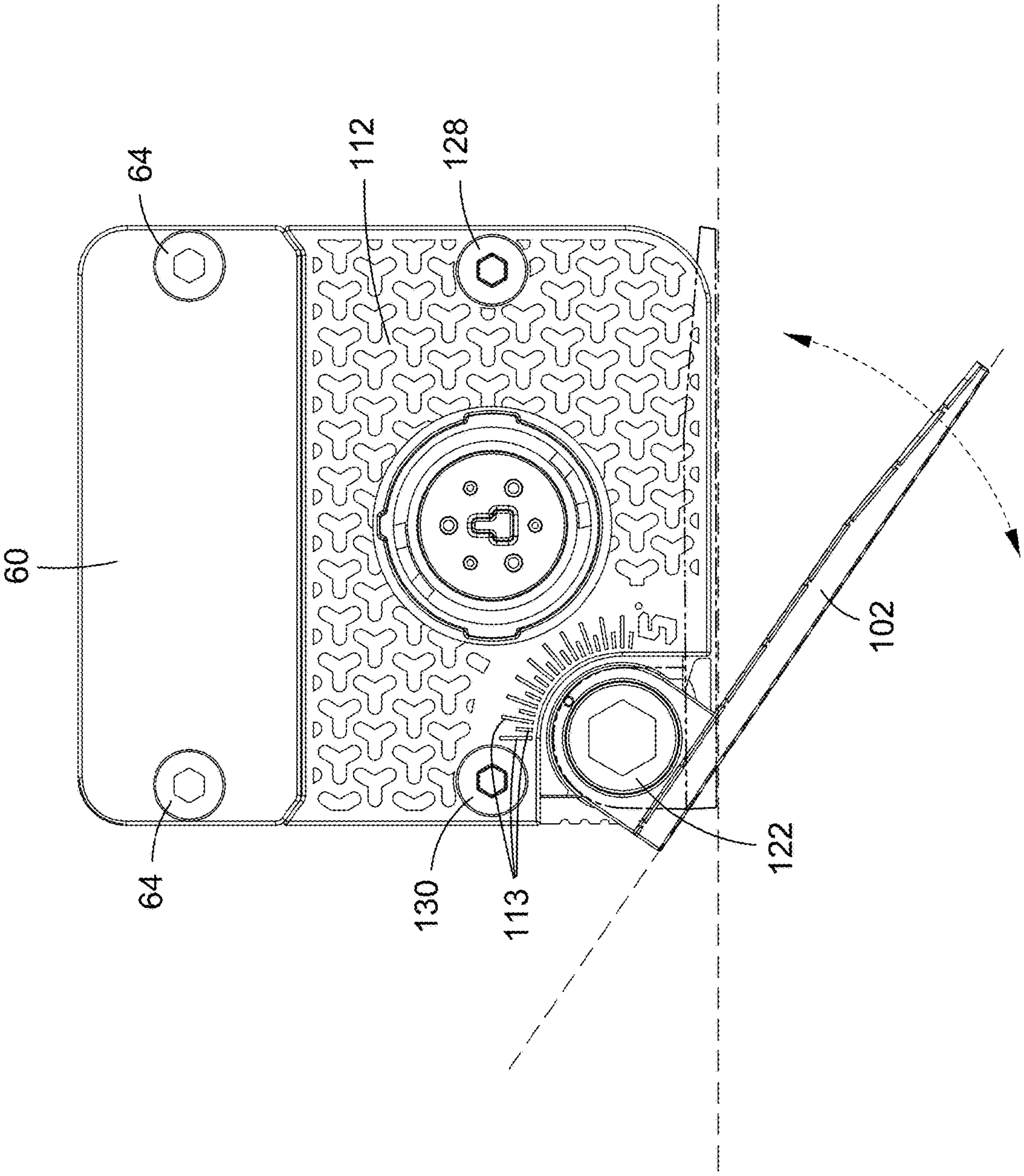
FIG. 5 is an end view of the end of the light fixture illustrated in FIG. 4.

In one embodiment, the tilt mechanisms 100 are also configured to allow a user to determine or validate a tilt angle. Specifically, as shown in FIG. 5, the support plate 112 has a plurality of marker lines 113 or other position indicators, optionally five-degree marker lines, which assist in determining an angle of tilt, such as up to ninety degrees from a horizontal.

In one embodiment, the support plate 112 may be advantageously molded, such as from metal or a durable polymer, such as to incorporate the various features thereof, including the marker lines 113.

In use, a user may adjust the position of the mounts 102 relative to the support plates 112, and thus the fixture 2, thus allowing the angular position or tilt of the fixture relative to the mounts 102, and thus a support surface, to be changed. In one embodiment, the angular position of the fixture 2 may be changed after the mounts 102 have been connected to a support surface (such as via a fastener passing through an aperture thereof), or after.

In order to adjust the position of the mounts 102, the user loosens the connectors 122. This allows the extensions 106 to rotate relative to the receiving portions 116. The user may then tighten the connectors 112, causing the extensions 106 to be drawn tight into the receiving portions 116, with the threaded washers 124, which are located in between, tightly gripping the end faces thereof, thereby preventing adjacent extensions 106 and receiving portions 116, from rotating relative to one another. Thus, the position of the mounting plates 102 and 202 is configured to be maintained relative to the first and second support structures 30 and 40 of the light fixture 2.

As indicated, the marker lines 113 aid a user in confirming the selected tilt angle, such as when installing multiple fixtures with a common tilt angle. This streamlines the process of matching the tilt position of multiple fixtures 2.

Accordingly, it will be appreciated that the light fixture 2 defines at least one tilt mechanism 100 for accepting at least one pivotable mount 102, such that in a preferred configuration, the tilt mechanisms 100 include corresponding support plates 112, and receiving portions 106 of the mounts 102 are received in receiving portions 116 of the support plates 112. As a result, this sleeved, lockable, and pivoting relationship between components allows for numerous advantages, including at least that valuable space is saved in the light fixture 2, and further that the light fixture 2 is enabled to be fixed lower to surfaces, meaning that the possibility of dark spots at a bottom wall surface is reduced. Moreover, the tilt mechanisms 100 desirably provide a clean and neat method of enabling the light fixture 2 to be tilted within the physical space of the light fixture 2. Additionally, because the movement of the tilt mechanisms 100 is fluid (e.g., no "clicks" or restrictions to the movement), the tilt mechanisms 100 enable an installer to determine a precise angle of tilt, if required.

The tilt mechanisms 100 eliminate the need for an external bracket or knuckle to adjust such an angle from the horizontal. One advantage to this configuration is that the mount 102 can be located closer to the body of the light, reducing stresses on the mount and associate connection to the light fixture 2. Similarly, the configuration where the extension 106 extends into the receiving portion 116, including where the receiving portion is located inside of a housing portion of the light fixture 2, both causes the mount 102 to be located closer to the body of the light fixture but also causes transmitted forces to be transferred a point inside the body rather than externally thereto.

Additionally, it will be appreciated that a suitable alternative light fixture (not shown) may include only one tilt mechanism, similar to either of the tilt mechanisms 100 without departing from the scope of the disclosed concept.

While in one embodiment the tilt mechanism is shown as comprising a support plate that comprises a portion of an end of a light fixture, the support plate might define the entire end of the light fixture. Further, in other embodiments, the support plate might be integral to the housing of the fixture, such as being formed as a portion of the housing.

While in one embodiment the tilt mechanism is described and illustrated as including an extension which extends outwardly from the mount into to recessed receiving portion of the support plate, the opposite configuration might be utilized (such as where an extension extends outwardly from the support plate into a recessed receiving portion defined by the mount or where a receiving portion is defined by a body which extends outwardly from the support plate; however, in such configurations the point of rotation is then outside of the housing an sets the mount farther out from the housing).

While in one embodiment the tilt mechanism is shown as used with the particular light in FIGS. 1-8, including where the light has LEDs which are configured to direct light generally upwardly, the light might have various other configurations. For example, the light might be configured so that illumination elements such as LEDs direct light laterally (such as out one side of the light fixture or the other).

In some embodiments, the light fixtures 2 might be configured to connect to one another in other manners than by flexible connectors 4. For example, the light fixtures 2 might include outwardly extending male pins which are configured to plug into corresponding female socks. Certain light fixtures 2 might also have only male or only female connectors. Also, in some embodiments, the light fixtures 2 might be joined to one another by mechanical connectors. For example, an end of one light fixture might include a tab which is configured to engage a slot on another light fixture. The tilt mechanism of the invention might also be used with a light fixtures which are not configured to be operatively coupled.

It will be understood that the above-described arrangements of apparatus and the method there from are merely illustrative of applications of the principles of this invention and many other embodiments and modifications may be made without departing from the spirit and scope of the invention as defined in the claims.

What is claimed is:

1. A light fixture, comprising:

a support structure;

a number of light emitting elements supported by the support structure and each configured to emit visible light; and at least one tilt mechanism coupled to the support structure, the at least one tilt mechanism comprising:

a support coupled to the support structure, the support having a first face in a first plane;

a mount pivotably coupled to the support, the mount having a second face in a second plane; and a coupling member disposed between the support and the mount, the coupling member having a first side which engages said first face of said support and a second side which engages said second face of said mount and which is positioned in a third plane between said first plane and said second plane, said coupling member being configured to resist rotation of the support with respect to the mount, when the mount is coupled to the support.

2. The light fixture according to claim 1, wherein the coupling member is a washer and wherein the first and second sides are ribbed.

3. The light fixture according to claim 1, wherein the mount comprises a foot and an extension and said support comprises a receiving portion for accepting said extension of said mount therein, wherein said second face is associated with said extension, said first face is associated with said receiving portion and said second face faces said first face.

4. The light fixture in accordance with claim 3, wherein said receiving portion is located in an internal portion of said support structure.

5. The light fixture in accordance with claim 4, wherein said support has a second face which faces said support structure and wherein said first face faces away from said support structure, and wherein said receiving portion extends outwardly from said second face of said support.

6. The light fixture according to claim 1, wherein the at least one tilt mechanism further comprises a connector which connects said mount to said support and selectively generates a force generally perpendicular to said first, second and third planes, compressing said first side of said coupling member against said first face of said support and said second side of said coupling member against said second face of said mount.

7. The light fixture according to claim 1, wherein said support structure has a first end and a second end and the at least one tilt mechanism comprises a first tilt mechanism at said first end and a second tilt mechanism at said second end.

8. A light fixture, comprising:

a support structure;

a number of light emitting elements supported by the support structure and each configured to emit visible light; and at least one tilt mechanism coupled to the support structure, the at least one tilt mechanism comprising:

a receiver located in said support structure, said receiver defining a receiving passage which extends along an axis and has an end surface;

a mount, said mount comprising a foot and an extension, said extension having a free end, said extension located in said receiving passage of said receiver with said free end facing said end surface of said receiver and rotatable with respect to said receiver; and a connector which connects said extension of said mount to said receiver, said connector generating an axial force along said axis.

9. The light fixture according to claim 8, wherein said connector comprises a threaded fastener which extends through said extension into engagement with said receiver.

10. The light fixture according to claim 9, wherein said threaded fastener has a head which is located at a side of said mount opposite said free end of said extension and a threaded end which threadably engages said receiver.

11. The light fixture according to claim 9, wherein a coupling member disposed between the end surface of said receiving passage and said free end of said extension, the coupling member being configured to resist rotation of the extension relative to said receiver.

12. The light fixture according to claim 11, wherein said coupling member comprises a washer having first and second ribbed faces.

13. The light fixture according to claim 8, wherein said support structure has a first end and said receiver comprises a body which extends into said support structure from a rear of said first end.

14. The light fixture according to claim 8, wherein said receiver defines a generally cylindrical opening.

15. The light fixture according to claim 8, wherein said support structure comprises a housing having a first end and a second end, a plate located at said first end and said receiver associated with said plate.

16. The light fixture according to claim 15, wherein said axis extends parallel to a second axis through said first and second ends of said housing.

17. The light fixture according to claim 15, wherein said housing has a top and said number of light emitting elements are configured to emit light outwardly of said top.

18. The light fixture according to claim 8, wherein said foot has a planar bottom surface.

19. A light fixture, comprising:

a support structure;

a number of light emitting elements supported by the support structure and each configured to emit visible light; and at least one tilt mechanism coupled to the support structure, the at least one tilt mechanism comprising:

a receiver located in said support structure said receiver defining a receiving passage which extends along an axis and has an end with a first face;

a mount, said mount comprising a foot and an extension, said extension having an end with a second face, said extension located in said receiving passage of said receiver and rotatable with respect to said receiver;

a coupling member having a first side and a second side, said coupling member having a first side and a second side, said first side contacting said first face of said end of said receiver and said second side contacting said second face of said extension of said mount; and a connector which connects said engaging member of said mount to said receiver, said connector generating an axial force along said axis which compresses said coupling member between said receiver and said extension of said mount to selectively resist rotation of said mount within said receiving passage.

* * * * *